United States Patent [19]

Lew

[11] Patent Number: 4,986,134
[45] Date of Patent: Jan. 22, 1991

[54] VORTEX FLOWMETER WITH INERTIALLY BALANCED VORTEX SENSOR

[76] Inventor: Hyok S. Lew, 7890 Oak St., Arvada, Colo. 80005

[21] Appl. No.: 412,793

[22] Filed: Sep. 26, 1989

[51] Int. Cl.$^5$ .............................................. G01F 1/32
[52] U.S. Cl. ................................................. 73/861.24
[58] Field of Search ........................ 73/861.22, 861.24

[56] References Cited

U.S. PATENT DOCUMENTS

| | | | |
|---|---|---|---|
| 1,935,445 | 11/1933 | Heinz | 73/861.24 |
| 4,069,708 | 1/1978 | Fussell Jr. | 73/861.24 |
| 4,727,756 | 3/1988 | Lew | 73/861.24 |

*Primary Examiner*—Herbert Goldstein

[57] ABSTRACT

A vortex shedding flowmeter comprises a vortex generating bluff body disposed across a first cross section of a flow passage and an inertially balanced vortex sensing planar member disposed across a second cross section of the flow passage parallel to the vortex generating bluff body on a plane parallel to the central axis of the flow passage in a pivotable arrangement about a pivot axis generally coinciding with the central axis of the flow passage, wherein one extremity of the vortex sensing planar member is connected to a transducer converting an alternating torque about the pivoting axis generated by vortices shed from the vortex generating bluff body and experienced by the vortex sensing planar member to an alternating electromotive force providing information on the flow rate of the fluid moving through the flow passage.

20 Claims, 2 Drawing Sheets

VORTEX FLOWMETER WITH INERTIALLY BALANCED VORTEX SENSOR

BACKGROUND OF THE INVENTION

A bluff body of an elongated cylindrical shape with a cross section of a nonstreamlined geometry disposed perpendicular to the direction of fluid flow sheds a series of vortices from the two cylindrical sides thereof in an alternating pattern at a frequency linearly proportional to the fluid velocity in a range of Reynolds number greater than 1,000 and less than 400,000, where the Reynolds number based on the bluff body width is a dimensionless flow characteristic number equal to the product of the fluid velocity and the bluff body width divided by the kinematic viscosity of the fluid. As a consequence, a well designed vortex shedding flowmeter should be capable of measuring fluid velocities in a velocity range wherein the ratio of the maximum measurable velocity to the minimum measurable velocity (turn-down ratio) is approximately equal to 400 to 1. In actuality, the most advanced version of the vortex shedding flowmeters available at the present time has a turn-down ratio of 60 to 1, while other commonly available versions have turn-down ratio no bether than 15 to 1. At Reynolds numbers as low as 500, the vortex generating bluff body sheds vortices in a clear and regular pattern. However, the fluctuations in the momentum of the moving fluid created by the vortex shedding at such low Reynolds numbers are so weak that the most of the existing vortex sensing technologies fail to direct the vortices, as the vibration noises originating from the pipeline vibrations also picked up by the vortex sensor overwhelm the vortex signal. It is a straight forward logic that a perfect vortex sensor must be selectively sensitive only to the vortex-generated flow fluctuations and insensitive to the momentum fluctuations associated with the structural vibrations of the flowmeter body.

The vortex shedding flowmeter of the present invention comprises a vortex generating bluff body and a inertially balanced vortex sensing planar member disposed down stream of the bluff body wherein a deflective portion of the vortex sensing planar member is coupled to a transducer that converts the fluctuating fluid dynamic forces experienced by the vortex sensing planar member to electrical signals, from which the frequency of the vortex shedding and/or the amplitude of the fluctuating fluid dynamic force associated with the vortex shedding are determined as a measure of the fluid velocity (volume flow rate) and/or the fluid momentum (mass flow rate).

BRIEF SUMMARY OF THE INVENTION

The primary object of the present invention is to provide a vortex shedding flowmeter comprising a vortex generating bluff body and a vortex sensing planar member disposed downstream of the bluff body, wherein the vortex sensing planar member is inertially balanced in such a way that it transmits the fluctuating fluid dynamic force associated with the vortices to a transducer, while it does not transmit the vibration noises associated with the structural vibrations of the pipeline to the transducer.

Another object is to provide a vortex sensing planar member disposed across a flow passage extending through a flowmeter body, that is supported by a support member affixed to the flowmeter body in a pivotable arrangement about a pivot axis parallel to the direction of the fluid flow and passing through a midsection of the vortex sensing planar member wherein the two halves of the vortex sensing planar member located on the two opposite sides of the pivoting axis are inertially balanced to one another about the pivot axis and the leading edges of those two halves of the vortex sensing planar membrane are off-set from one another by a distance different from an integer times the wave length of the sinuating streamlines created by the vortices. A deflective portion of the vortex sensing planar member is connected to a transducer.

A further object is to provide a vortex sensing planar member disposed across a flow passage extending through a flowmeter body, that is supported by a support member affixed to the flowmeter body in a pivotable arrangement about a pivot axis parallel to the direction of the fluid flow and located adjacent to the wall of the flow passage, wherein one portion of the vortex sensing member located on one side of the pivoting axis and substantially extending across the flow passage and the other portion thereof located on the other side of the pivoting axis are inertially balanced to one another about the pivot axis, and a deflective portion of the vortex sensing planar member is connected to a transducer.

Yet another object is to provide a vortex sensing planar member supported by a support member affixed to the flowmeter body in a pivoting arrangement about a pivot axis parallel to the direction of the fluid flow, which planar member is inertially balanced about the pivot axis, whereby structural vibrations of the flowmeter body transmitted to the vortex sensing planar member through the support member create little vibratory pivoting motions of the vortex sensing planar member about the pivot axis, wherein at least one extremity of the vortex sensing planar member is connected to at least one transducer.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
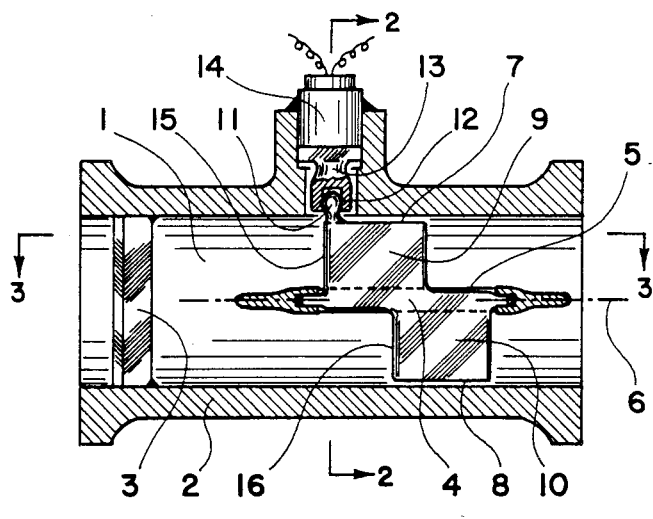
FIG. 1 illustrates a cross section of an embodiment of the vortex shedding flowmeter including an inertially balanced vortex sensing planar member.

In FIG. 1 there is illustrates a cross section of an embodiment of the vortex shedding flowmeter including an inertially balanced vortex sensing planar member. The vortex shedding flowmeter includes a flow passage 1 extending through a flowmeter body 2 and a vortex generating bluff body 3 of an elongated cylindrical shape having a nonstreamlined cross section, which bluff body 3 is disposed across a first cross section of the flow passage 1 and secured to the flowmeter body at one or both extremities thereof. An inertially balanced vortex sensing planar member 4 is disposed across a second cross section of the flow passage 1 downstream of the bluff body 3 in a general parallel arrangement to the bluff body 3 on a plane generally parallel to the central axis of the flow passage 1. The vortex sensing planar member 4 is pivotably supported by a planar support member 5 disposed generally perpendicular to the vortex sensing planar member 4 and affixed to the flowmeter body 2, wherein the vortex sensing planar member 4 is pivotable about a pivot axis 6 generally coinciding with the central axis of the flow passage 1. The two extremities 7 and 8 of the vortex sensing planar member 4 are not touching the wall of the flow passage and, consequently, the vortex sensing planar member 4 is freely pivotable about the pivot axis 6. The mass distributions in the two halves 9 and 10 of the vortex sensing planar member 4 are inertially balanced in such a way that the pivot axis 6 generally coincides with the central axis of the inertia of the vortex sensing planar member 4. In other words, the moment of inertia of the first half 9 of the vortex sensing planar member 4 about the pivot axis 6 is equal to that of the second half 10 thereof. One extremity 7 of the vortex sensing planar member 4 includes a ball joint 11 that engages a socket joint 12 included in a force receiving member 13 extending from a transducer container 14 anchored to the flowmeter body 1. It should be understood that other type of mechanical joints such as a cylindrically fitted coupling, threadedly joining coupling, welded coupling and other pressure fitting type coupling may be employed in place of the ball and socket joint used in the particular embodiment. The leading edges 15 and 16 of the two halves of the vortex sensing planar member 4 are off-set from one another by a distance generally equal to noninteger times the wave length of sinuating streamlines created by the vortices shed from the bluff body 3, whereby the fluid dynamic lift forces respectively experienced by the two halves 8 and 9 of the vortex sensing planar member 4 are in opposite directions to one another and, consequently, produce a torque about the pivot axis 6.

Figure 2:
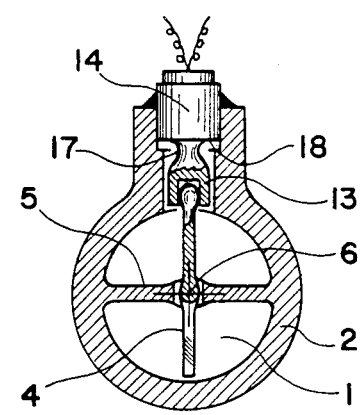
FIG. 2 illustrates another cross section of the embodiment shown in FIG. 1.

In FIG. 2 there is illustrated another cross section of the embodiment of the vortex shedding flowmeter shown in FIG. 1, which cross section is taken along plane 2—2 as shown in FIG. 1. The planar support 5 supporting the vortex sensing planar member 4 in a pivoting arrangement is disposed across the flow passage 1 on a plane generally perpendicular to the plane including the bluff body 3 and the vortex sensing planar member 4, which planar support member 5 is affixed to the flowmeter body 2 at both extremities thereof. The force receiving member 13 extends from a reinforcing rib 17 built on a thin end wall 18 of the transducer container 14, wherein the reinforcing web 17 extends across the thin end wall 18 in a direction generally parallel to the central axis of the flow passage, that coincides with the pivot axis 6.

Figure 3:
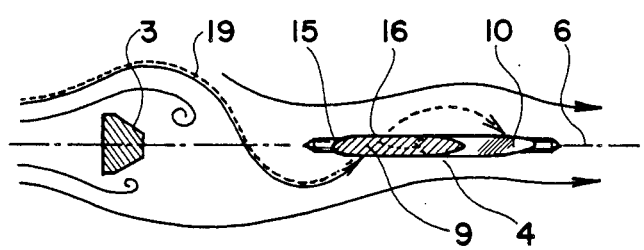
FIG. 3 illustrates a further cross section of the embodiment shown in FIG. 1.

In FIG. 3 there is illustrated a cross section of the combination of the bluff body 3 and the vortex sensing planar member 4 included in the embodiment of the flowmeter shown in FIG. 1, which cross section is taken along plane 3—3 as shown in FIG. 1. The bluff body 3 shedding vortices from the two cylindrical sides thereof in an alternating pattern creates sinuating streamlines 19 trailing the bluff body. It is preferable to off-set the leading edges 15 and 16 of the two halves of the vortex sensing planar member 4 by a distance equal to one half wave length of the sinuating streamlines 19, whereby the lift force on the first half 9 of the vortex sensing planar member 4 is in the opposite direction to that of the lift force on the second half 10 of the vortex sensing planar member 4, which combination of the lift forces produces an oscillating torque about the pivot axis 6 alternating at a frequency proportional to the velocity of fluid moving through the flow passage. The amplitude of the alternating fluid dynamic torque is generally proportional to the square of the fluid velocity for an well designed vortex sensor and to 1.5 to 3 powers of the fluid velocity in general for vortex sensors of inferior designes. The transducer contained in the transducer container 14 generates an alternating electromotive force wherein the frequency thereof is proportional to the fluid velocity and the amplitude is porportional linearly or nonlinearly to the dynamic pressure of the fluid flow, that is equal to one half of the fluid density times the square of the fluid velocity. Once the relationship between the frequency of the transducer output signal and the fluid velocity, and the relationship between the amplitude of the transducer output signal and the dynamic pressure of the fluid flow are determined empirically by calibrating the flowmeter, the volume flow and the mass flow rates are respectively determined from the frequency and a combination of the frequency and amplitude of the alternating electrical signal representing the alternating fluid dynamic torque experienced by the vortex sensing planar member. The density of the fluid is determined as a ratio of the mass flow rate to the volume flow rate.

Figure 4:
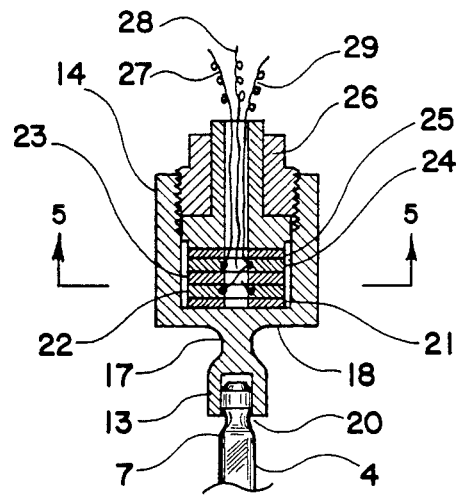
FIG. 4 illustrates a cross section of an embodiment of a Piezo electric transducer usuable in inconjunction with the inertially balanced vortex sensing planar member.

In FIG. 4 there is illustrated a cross section of the transducer container 14 included in the embodiment of the vortex shedding flowmeter shown in FIGS. 1, 2 and 3, which cross section is taken along plane 2—2 as shown in FIG. 1. The transducer container 14 has a circular cylindrical cavity that has a thin end wall 18 reinforced by a rib 17 disposed on a plane parallel to the central axis of the flow passage 1, from which rib 17 the force receiving member 13 extends. A deflective portion of the planar vortex sensing member 4 is connected to the force receiving member 13 by a mechanical coupling 20. A stacked combination of an insulator disc 21, a split electrode disc 22, a Piezo electric disc 23, a split electrode disc 24 and an insulator disc 25 contained in the cylindrical cavity of the transducer container 14 is pressed against the thin end wall 18 by a plug 26 threadedly engaging the open end of the cylindrical cavity of the transducer container 14. Two electrical wires 27 and 28 transmitting the vortex signals and a ground wire 29 extend from the electrodes included in the stacked combination of the transducer elements.

Figure 5:
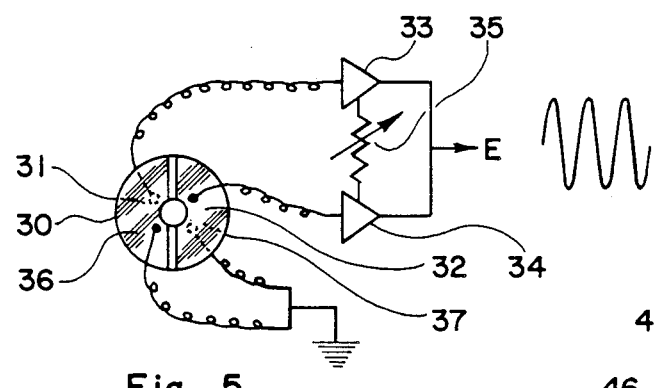
FIG. 5 illustrates an arrangement of the Piezo electric element included in the transducer embodiment shown in FIG. 4.

In FIG. 5 there is illustrated a plan view of a Piezo electric element that can be packaged into a combination of the stacked transducer elements such as that included in the embodiment shown in FIG. 4, and an electronic circuitry refining electrical signals generated by the transducer. A circular Piezo electric disc 30 of uniform polarization has two sets of split electrodes respectively disposed on two opposite sides of the Piezo electric disc, wherein the electrodes are split along a plane including the reinforcing rib 17 shown in FIG. 4. The first two semicircular electrodes 31 and 32 respectively disposed on the two opposite sides of the Piezo electric element 30 on two opposite sides of the plane including the reinforcing rib 17 are respectively connected to two amplifiers 33 and 34, which amplifiers 33 and 34 have a signal balancing means 35 therebetween such as one or a pair of variable resistors. The second two semicircular electrodes 36 and 37 respectively disposed on the two opposite sides of the Piezo electric element 30 on two opposite sides of the plane including the reinforcing rib are grounded. The oscillatory fluid dynamic torque about the pivot axis 6 shown in FIG. 2 alternatively compresses and decompresses the two halves of the Piezo electric disc 30 and generates electromotive forces of opposite signs from the two halves of the Piezo electric disc 30. Since the amplifiers 33 and 34 are connected to the two semicircular electrodes 31 and 32 respectively disposed on the two opposite sides of the Piezo electric element 30 on the two opposite sides of the plane including the reinforcing rib 17, along which plane the two semicircular electrodes 31 and 32 are split from one another, the electromotive force supplied from the two semicircular electrodes to the two amplifiers 33 and 34 have the same sign, which are added after amplication by the amplifiers 33 and 34. The structural vibrations of the flowmeter body in directions parallel to the vortex sensing planar member do not generate any net output signal because the two electromotive forces resulting from these structural vibrations respectively supplied from the two semicircular electrodes 31 and 32 have opposite signs and become canceled between the two amplifiers 33 and 34 as the signal balancing means 35 is set to cancel these vibration noises. As a consequence, the resultant electromotive force E supplied by the combination of the transducer and electronic circuitry shown in FIG. 5 provides electrical signals mostly generated by the vortices shed from the vortex generating bluff body. The fluid velocity or volume flow rate is determined from the frequency of the alternating electromotive force E and the mass flow rate is determined from a combination of the frequency and amplitude of the alternating electromotive force E. It should be mentioned that the shape of the electrodes may take any geometry as long as they are split along the plane including the reinforcing rib.

Figure 6:
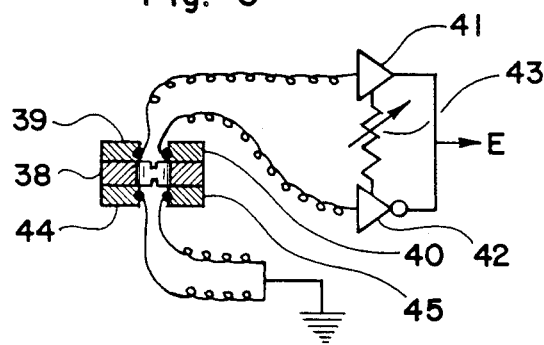
FIG. 6 illustrates another arrangement of the Piezo electric element included in the transducer embodiment shown in FIG. 4.

In FIG. 6 there is illustrated a cross section of another arrangement of the combination of the stacked transducer elements included in the cylindrical cavity of the transducer container shown in FIG. 4. Each side of the Piezo electric disc 38 has a pair of electrodes split from one another along a plane including the reinforcing rib 17 shown in FIG. 4. The two electrodes 39 and 40 disposed on one side of the PIezo electric disc 38 are respectively connected to a noninverting amplifier 41 and an inverting amplifier 42. The vibration noise signals are canceled between the two amplifiers 41 and 42 by means of the signal balancing means 43 such as one or a pair of variable resistors balancing the level of signal outputs between the two amplifiers. The electrodes 44 and 45 disposed on the other side of the Piezo electric element 38 are grounded. It is not difficult to realize that, when the combination of the stacked transducer elements shown in FIG. 6 is split along a plane including the reinforcing rib 17 shown in FIG. 4 and one of the two split halves is turned over, the inverting amplifier 42 can be replaced by another noninverting amplifier like the amplifier 41, wherein the same electronic circuitry as that of FIG. 6 refines the electrical signal.

Figure 7:
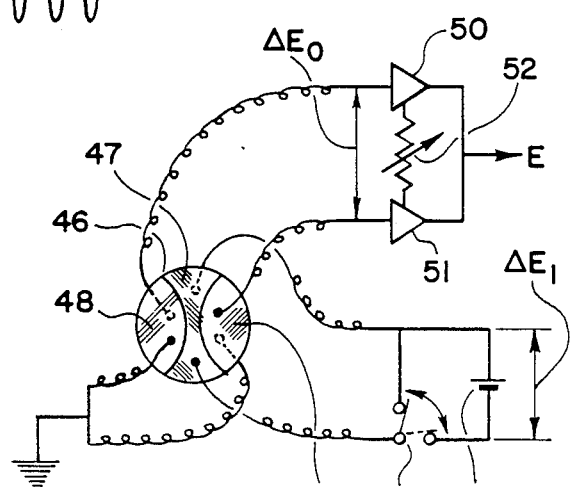
FIG. 7 illustrates a further arrangement of the Piezo electric element included in the transducer embodiment shown in FIG. 4.

In FIG. 7 there is illustrated a plan view of a further arrangement of the combination of the stacked transducer elements employable in the same transducer packaging as that shown in FIG. 4. Each side of the Piezo electric disc 46 has a middle electrode 47 straddling the plane including the reinforcing rib 17 shown in FIG. 4 and two side electrodes 48 and 49 separated by the middle electrode 47. The side electrodes are connected to the pair of amplifiers 50 and 51 with signal balancing means 52, or grounded by the same electrical circuits as those shown in FIG. 5. The two middle electrodes respectively disposed on the two opposite sides of the Piezo electric disc 46 are connected to the two opposing terminals of a test electromotive force source 53 of potential difference $\Delta E_I$ thereacross. When the switch 54 is closed momentarily, the test source 53 supplies an input electrical pulse $\Delta E_I$ across the two middle electrodes respectively disposed on the two opposite sides of the PIezo electric disc 46, which input electrical pulse produces a mechanical impulse on the Piezo electric disc 46 and generates an output electrical pulse $\Delta E_O$ across the two side electrodes respectively connected to the two amplifiers 50 and 51. The ratio of the input electrical pulse to the output electrical pulse, e.g., $\Delta E_I/\Delta E_O$ provides a calibration standard which can be used to determine the amplitude of the alternating fluid dynamic force generated by the vortices from the amplitude of the alternating electrical signal E provided by the two amplifiers 50 and 51 arranged in a parallel combination. In other words, the ratio of $\Delta E_I/\Delta E_O$ obtained intermittently on a real time basis to $\Delta E_I/\Delta E_O$ intially obtained at the time of calibration of the flowmeter provides accurately the amplitude of the alternating fluid dynamic force when that ratio is multiplied to the proportionally coefficient obtained during the initial calibration of the flowmeter, that converts the amplitude of the alternating electrical signal E to the amplitude of the alternating fluid dynamic force generated by the vortex shedding. The transducer assembly and electronic circuitry shown in FIG. 7 provides a self-calibrating transducer that eliminates error in determining the amplitude of the alternating fluid dynamic force generated by the vortices from the amplitude of the alternating electrical signal generated by the transducer connected to the vortex sensing planar member.

Figure 8:
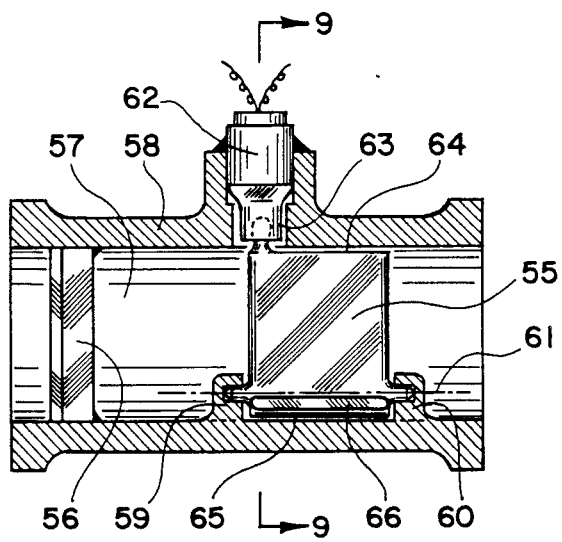
FIG. 8 illustrates a cross section of another embodiment of the vortex shedding flowmeter including an inertially balanced vortex sensing planar member.

In FIG. 8 there is illustrated a cross section of another embodiment of the vortex shedding flowmeter including an inertially balanced vortex sensing planar member. The vortex sensing planar member 55 disposed parallel to and downstream of the vortex generating bluff body 56 is disposed across the flow passage 57 included in the flowmeter body 58 and secured by a pair of support members 59 and 60 affixed to the flowmeter body 58 in a pivotable arrangement about a pivot axis 61 parallel to the central axis of the flow passage 57 and adjacent to a portion of the flow passage wall diametrically opposite to the transducer container 62 affixed to the flowmeter body 58. The force receiving member 63 extending from the transducer container 62 is connected to one extremity 64 of the vortex sensing planar member 55. The other extremity 65 of the vortex sensing planar member 55 includes a counter-mass 66 that inertially balances the vortex sensing planar member 55 about the pivot axis 61. In other words, the moment of inertia of the first section of the vortex sensing planar member 55 intermediate the first extremity 64 and the pivot axis 61 about the pivot axis 61 is generally equal to the moment of inertia of the second section of the vortex sensing planar member 55 intermediate the second extremity 65 and the pivot axis 61 about the pivot axis 61. Since the first portion of the vortex sensing planar member 61 intermediate the pivot axis 61 and the extremity 64 thereof connected to the transducer 62 makes up the most of the fluid dynamic force generating surface, the alternating lift force on the first portion of the vortex sensing planar member generates an alternating torque about the pivot axis 61, which in turn generates an alternating electromotive force from the transducer. The volume flow rate and/or mass flow rate are obtained in the same manners as those descrived in conjunction with FIG. 3.

Figure 9:
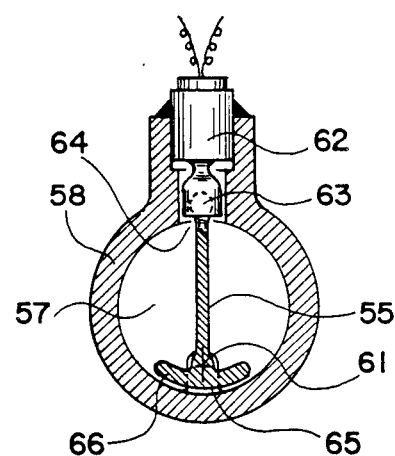
FIG. 9 illustrates another cross section of the embodiment shown in FIG. 8.

In FIG. 9 there is illustrated another cross section of the embodiment of the vortex shedding flowmeter shown in FIG. 8, which cross section is taken along plane 9—9 as shown in FIG. 8. In this view, the counter-mass 66 inertially balancing the stub second portion of the vortex sensing planar member 55 about the pivot axis 61 against the first portion extending to the extremity 64 is clearly illustrated.

Figure 10:
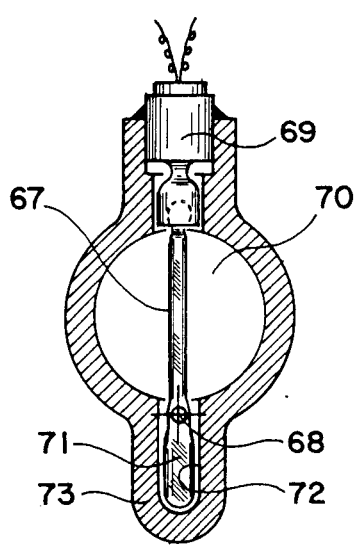
FIG. 10 illustrates a cross section of a further embodiment of the inertially balanced vortex sensing planar member, which cross section is equivalent to that shown in FIG. 9.

In FIG. 10 there is illustrated a further embodiment of the inertially balanced vortex sensing planar member depicted in a cross section equivalent to that shown in FIG. 9. The vortex sensing planar member 67 has a first portion intermediate the pivot axis 68 and the transducer 69 extending all the way across the flow passage 70, as the second portion 71 inertially counter balancing the first portion is contained in a cavity 72 included in the flowmeter body 73 in a clearance relationship. It is noticed that the pivot axis 68 is disposed exteriorly to the flow passage 70.

Figure 11:
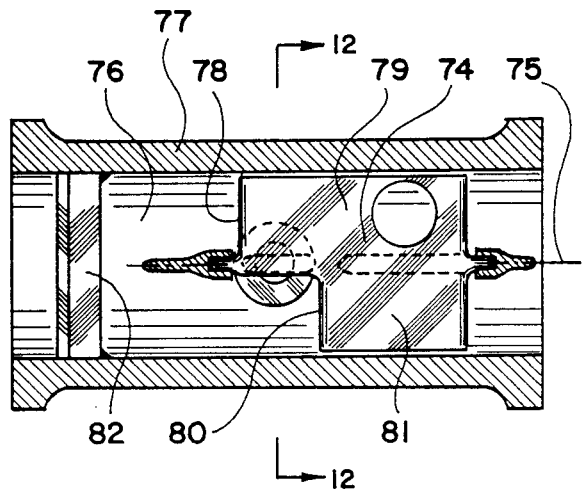
FIG. 11 illustrates a cross section of yet another embodiment of the vortex shedding flowmeter including an inertially balanced vortex sensing planar member.

In FIG. 11 there is illustrated a cross section of yet another embodiment of the vortex shedding flowmeter having an inertially balanced vortex sensing planar member 74, which is secured in a pivotable arrangement about a pivot axis 75 generally coinciding with the central axis of the flow passage included in the flowmeter body 77. The leading edge 78 of the first half 79 of the vortex sensing planar member 74 and the leading edge 80 of the second half 81 thereof are off-set from one another by a distance equal to the half wave length of the sinuating streamlines created by the vortices shed from the vortex generating bluff body. The two halves 79 and 81 of the vortex sensing planar member 74 are inertially balanced relative to one another about the pivot axis 75.

Figure 12:
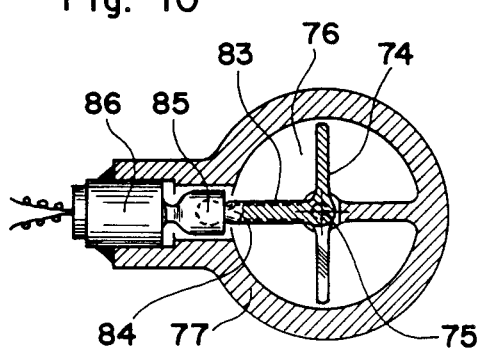
FIG. 12 illustrates another cross section of the embodiment shown in FIG. 11.

In FIG. 12 there is illustrated another cross section of the embodiment of the vortex shedding flowmeter shown in FIG. 11, which cross section is taken along plane 12—12 as shown in FIG. 11. The vortex sensing planar member 74 includes a laterally extending planar member 83 extending from a midsection thereof including the pivot axis 75 and towards the wall of the flow passage, wherein the extremity 84 of the lateral extension 83 is connected to a force receiving member 85 extending from a transducer container 86. This embodiment operates on the same principles as those described in conjunction with FIGS. 3, 4, 5, 6 and 7.

Figure 13:
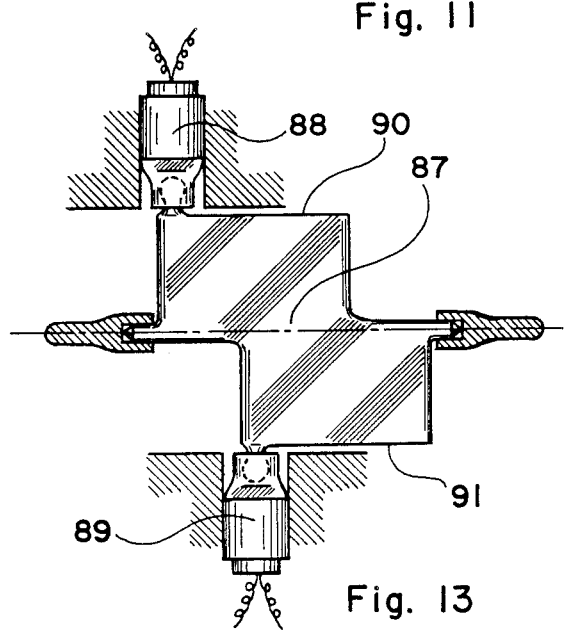
FIG. 13 illustrates an embodiment of the inertially balanced vortex sensing planar member including dual transducers.

In FIG. 13 there is illustrated yet a further embodiment of the inertially balanced vortex sensing planar member 87, that can be employed in the construction of the vortex shedding flowmeter shown in FIG. 1 in place of the element 4 shown therein. The vortex sensing planar members 87 and 4 shown in FIG. 1 have essentially the same construction and arrangement with one exception, that is the use of dual transducers 88 and 89 respectively connected to the two opposite extremities 90 and 91 of the vortex sensing planar member 87. The electrodes included in the two transducers respectively contained in the transducer containers 88 and 89, which are one of those arrangements shown in FIGS. 5, 6 and 7, are arranged in such a way that the two alternating electrical signals representing the vortices respectively generated by the two transducers 88 and 89 are in phase and the two noise signals associated with the structural vibration of the pipe line respectively generated by the two transducers are out of phase by 180 degrees, whereby the noise signals are canceled and a pure vortex signal is obtained by balancing and combining the two signals respectively generated by the two transducers 88 and 89.

It should be understood that the embodiments shown in FIGS. 1, 8, 10, 11 and 13 also work with other types of transducers such as those employing strain gauge, optical fiber, magnetic pick-up coil, etc., even though they work best with a Piezo electric type transducer. It should be mentioned that the vortex shedding flowmeters shown in FIGS. 1, 8, 10, 11 and 13 work as an in-line flowmeter as well as an insertion type flowmeter wherein the embodiments shown are supported by an elongated support member for inserting the flowmeter of a small port diameter into the midstream of a large diameter flow passage.

While the principles of the present have now been made clear by the illustrative embodiments, there will be many modifications of structures, arrangements, proportions, elements and materials immediately obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be resorted to falling within the scope of the inventions as defined by the claims which follow.

The embodiments of the invention in which an exclusive proporty or priviledge is claimed, are defined as follows:

1. An apparatus for measuring flow rate of fluid comprising in combination:

a) a body including a flow passage extending therethrough;

b) a vortex generating bluff body of an elongated cylindrical shape disposed across a first cross section of the flow passage;

c) a vortex sensing planar member disposed across a second cross section of the flow passage generally parallel to the vortex generating bluff body on a plane generally parallel to the central axis of the flow passage in a pivotable arrangement about a pivot axis generally parallel to the central axis of the flow passage and disposed at a midsection of the vortex sensing planar member, said pivotable arrangement allowing a pivoting movement of the vortex sensing planar member about said pivot axis over at least a minute angle, wherein leading edges of two halves of the vortex sensing planar member respectively located on two opposite sides of said pivot axis are off-set from one another by a distance generally equal to noninteger times the wave length of sinuating streamlines created by vortices shed from the vortex generating bluff body; and d) at least one transducer means connected to a deflective portion of the vortex sensing planar member for converting an alternating torque about said pivot axis generated by vortices shed from the vortex generating bluff body and experienced by the vortex sensing planar member to an alternating electromotive force.

2. A combination as set forth in claim 1 wherein volume flow rate of the fluid is determined from frequency of said alternating electromotive force.

3. A combination as set forth in claim 1 wherein mass flow rate of the fluid is determined from a combination of frequency and amplitude of said alternating electromotive force.

4. A combination as set forth in claim 3 wherein density of the fluid is determined from a ratio of the mass flow rate to volume flow rate of the fluid determined from the frequency of said alternating electromotive force.

5. A combination as set forth in claim 1 wherein said transducer means includes at least one Piezo electric element contained in a cavity of a transducer container vessel and pressed against a thin wall of said cavity, wherein a force receiving member extending from said thin wall is connected to said deflective portion of the vortex sensing planar member.

6. A combination as set forth in claim 5 wherein said combination includes a means for exerting an input electrical pulse of known amplitude across said Piezo electric element and a means for measuring an output electrical pulse from said Piezo electric element generated by said input electrical pulse, wherein ratio of the amplitude of said input electrical pulse to the amplitude of said output electrical pulse is used as a calibration standard in determining the amplitude of said alternating torque from the amplitude of said alternating electromotive force.

7. A combination as set forth in claim 1 wherein moments of inertia of said two halves of the vortex sensing planar member about said pivot axis are substantially balanced to one another.

8. A combination as set forth in claim 1 wherein said at least one transducer means is connected to one extremity of the vortex sensing planar member and another transducer means is connected to the other extremity of the vortex sensing planar member opposite to said one extremity, wherein alternating electromotive forces from said at least one and another transducer means are combined in such a way that noises generated by mechanical vibration of the body are cancelled therebetween and signals generated by vortices are obtained.

9. A combination as set forth in claim 8 wherein volume flow rate of the fluid is determined from frequency of said alternating electromotive force.

10. A combination as set forth in claim 8 wherein mass flow flow rate of the fluid is determined from a combination of frequency and amplitude of said alternating electromotive force.

11. A combination as set forth in claim 10 wherein density of the fluid is determined from a ratio of the mass flow rate to volume flow rate of the fluid determined from the frequency of said alternating electromotive force.

12. A combination as set forth in claim 8 wherein each of said transducer means includes at least one Piezo electric element contained in a cavity of a transducer container vessel and pressed against a thin wall of said cavity, wherein a force receiving member extending from said thin wall is connected to each of said extremities of the vortex sensing planar member.

13. A combination as set forth in claim 12 wherein said combination includes a means for exerting an input electrical pulse of known amplitude across at least one of the two Piezo electric elements and a means for measuring an output electrical pulse from said at least one of the two Piezo electric elements generated by said input electrical pulse, wherein ratio of the amplitude of said input electrical pulse to the amplitude of said output electrical pulse is used as a calibration standard in determining the amplitude of said alternating torque from the amplitude of said alternating electromotive force.

14. A combination as set forth in claim 8 wherein moments of inertia of said two halves of the vortex sensing planar member about said pivot axis are substantially balanced to one another.

15. A combination as set forth in claim 1 wherein said deflective portion of the vortex sensing planar member comprises a lateral extension extending from a midsection of the vortex sensing planar member and towards the wall of the flow passage, wherein an extremity of said lateral extension is connected to said transducer means.

16. An apparatus for measuring flow rate of fluid comprising in combination:

a) a body including a flow passage extending therethrough:

b) a vortex generating bluff body of an elongated cylindrical shape disposed across a first cross section of the flow passage;

c) a vortex sensing planar member disposed across a second cross section of the flow passage generally parallel to the vortex generating bluff body on a plane generally parallel to the central axis of the flow passage in a pivotable arrangement about a pivot axis generally parallel to the central axis of the flow passage and disposed close to wall of the flow passage, said pivotable arrangement allowing a pivoting movement of the vortex sensing planar member about said pivot axis over at least a minute angle, wherein moments of the inertia of a first portion of the vortex sensing planar member located on one side of said pivot axis and extending substantially across said second cross section of the flow passage and a second portion of the vortex sensing planar member located on the other side of said pivot axis opposite to said one side are substantially balanced to one another; and d) at least one transducer means connected to a deflective portion of the vortex sensing planar member for converting an alternating torque about said pivot axis generated by vortices shed from the vortex generating bluff body and experienced by the vortex sensing planar member to an alternating electromotive force.

17. A combination as set forth in claim 16 wherein volume flow rate of the fluid is determined from frequency of said alternating electromotive force.

18. A combination as set forth in claim 16 wherein mass flow rate of the fluid is determined from a combination of frequency and amplitude of said alternating electromotive force.

19. A combination as set forth in claim 18 wherein density of the fluid is determined from a ratio of the mass flow rate to volume flow rate of the fluid determined from the frequency of said alternating electromotive force.

20. A combination as set forth in claim 16 wherein said second portion of the vortex sensing planar member is disposed substantially in a cavity included in said body.

* * * * *